Oct. 25, 1960  W. W. IRWIN ET AL  2,957,737
DESK TOP EDGE BINDER CONSTRUCTION
Filed Dec. 8, 1958

INVENTORS
WILLIAM W. IRWIN
EDWIN J. ANDERSEN
BY KENNITH C. MILLER

ATTORNEYS

United States Patent Office 2,957,737
Patented Oct. 25, 1960

2,957,737

DESK TOP EDGE BINDER CONSTRUCTION

William W. Irwin, East Grand Rapids, and Edwin J. Andersen and Kennith C. Miller, Grand Rapids, Mich., assignors to Irwin Seating Company, Grand Rapids, Mich., a corporation of Michigan Filed Dec. 8, 1958, Ser. No. 778,886

8 Claims. (Cl. 311—107)

This invention relates to desk tops. More particularly, it relates to desk tops especially suitable for school desks and the like.

In the past it was customary to construct school desk tops out of 3/4" plywood. However, such material suffered from several disadvantages, such as difficulty in cleaning and maintenance, the tendency to warp, and the amenability to scratching and intentional pencil mark impressions.

Consequently, with the advent of hard surfaced, easily cleaned laminated plastic materials, highly resistant to warpage, surface scratches and the like, desk tops were developed which employed such materials. Such tops were alternately constructed of plywood, with a plywood or a chipped core panel surfaced with decorative sheets of laminated plastic on the top and a backing sheet of laminated plastic on the bottom, or tops were constructed of a laminated sheet or panel of plastic material and a metal rim or molding around the peripheral edge thereof, to secure the panel to a metal base.

Such structures suffer from major disadvantages. The first alternative construction listed above had exposed wood edges which were easily dented, marred or scratched. The second alternative construction suffered from a major disadvantage in that the metal molding projects above the top surface of the laminated panel. This tends to reduce the usable desk top area and tends to catch tablets, books and the like, and also tends to cause dirt to collect at the edge. Moreover, difficulty was experienced in obtaining a firm and permanent seating of the panel and of the metal molding.

A general object of this invention, therefore, is to develop a plastic, desk top construction which presents a smooth top surface. A specific object of this invention is to develop a plastic desk top construction comprising a plastic panel and a metal molding which does not protrude above the top surface of the panel.

Another object of this invention is to develop a desk top construction with a metal molding providing a more permanent seating of the plastic panel as well as of the molding itself. A particular object of this invention is to develop a desk top construction involving a plastic panel top and a metal edge molding in which there is a concealed positive fastening of the panel to the underlying metal base.

These and other objects which may appear as this specification proceeds are achieved by this invention which will be described with reference to the drawings wherein.

In general, the drawings disclose a desk top which has a top panel and a base or tray. The panel is secured to the base by a peripheral molding. The construction is such that the top surface of the molding is flush with the top surface of the top panel. Moreover, the structure of the molding and of the base is such as to form a positive lock of the molding with the peripheral edge of the base.

Figure 1:
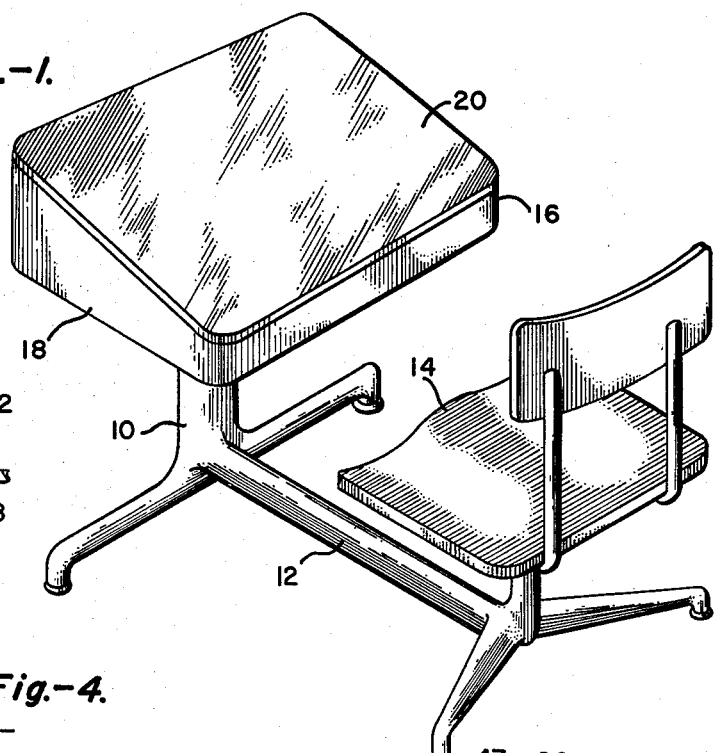
Fig. 1 is a perspective view of a school desk employing the desk top construction of this invention.

Referring specifically to the drawings, Fig. 1 illustrates a school desk 10 having a conventional pedestal 12. Mounted on the pedestal is a chair 14 and a desk 16. The desk has a storage compartment 18 covered by a top 20. This combination, however, is unnecessary to the invention and is described only for purposes of illustration.

The top 20 has a top surface panel 32, a supporting tray 21 and a peripheral molding 40. The tray 21 is of pressed metal and has raised ridges 22 which give it rigidity and structural strength. The top surfaces of the ridges 22 are flat and lie in a common plane. The tray 21 is secured to the desk body 18 by suitable means, such as, for example, hinges secured to the tray beneath embossments 24 and 25 which may be embodied in the tray.

Around the periphery of the tray 21 is a peripheral channel 23 having an outwardly extending, horizontally disposed flange 28. The flange 28 terminates in a bent edge 29. The top of the flange 28 is offset from the plane of the top surfaces of the ridges 22 by a distance $h$. The width of the flange 28 from the side wall of the channel to the bent edge 29 corresponds to a distance $w'$. The thickness of the flange, it will be observed, is a distance $d$.

The surface panel 32 comprises a peripheral, rabbeted edge 34. The distance from the plane of the top surface of the panel 32 to the top surface of the edge 34 corresponds to a distance $t$. The thickness of the edge 34 corresponds to a distance $t'$ (the thickness T of the panel 32 being equal to the sum of $t$ and $t'$). In this regard a laminated type of panel 32 is used, it is not necessary that the thickness $t'$ of the edge 34 correspond to the thickness of one or more lamina of the panel. All that is necessary is that the thickness $t'$ be sufficient for the particular panel employed to withstand the compression and stress forces encountered by the top construction 20 under normal use conditions. The width of the edge 34 is equal to a distance $w$.

Figure 4:
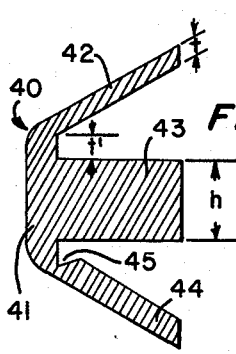
Fig. 4 is an enlarged sectional view of the metal molding of this invention, prior to installation.
Figure 3:
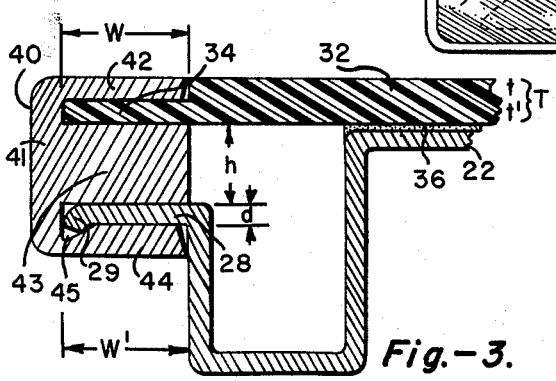
Fig. 3 is an enlarged sectional view taken along the plane 3—3 of Fig. 2.

The molding 40 as shown in Figs. 3 and 4 comprises a vertically disposed web portion 41 having at the top thereof a horizontally disposed flange portion or leg 42 of thickness $t$. The leg 42 extends inwardly from said web portion 41 by a distance $w$ as measured on the underside of the leg. At the bottom of said web portion 41 is a horizontally disposed, inwardly extending, bottom flange portion or leg 44 with a longitudinal groove or pocket 45 adjacent said web in the top surface of said bottom flange portion.

Between the top and bottom of said web 41 is a horizontally disposed, inwardly extending, medial flange portion or leg 43 of thickness $h$. This intermediate leg 43 functions as a shock absorber. The distance between the underside of the top flange portion and the top side of the medial flange portion corresponds substantially to the distance $t'$. The distance from the web portion to the end of said bottom flange portion corresponds substantially to the distance $w'$ while the minimum distance between the undersurface of the medial flange portion and the top surface of the bottom flange portion corresponds substantially to the distance d. All exterior corners of the molding, preferably, are rounded and present no exposed, sharp edges.

The central portions of the panel 32 are secured (Fig. 3) to the plateau portions 22 of the tray 21 by a layer of adhesive 36. The peripheral edge of the panel 32 is joined to the periphery of the tray 21 by the molding 40.

It will be observed that the rabetted edge 34 of said panel is disposed in press fit between the top leg 42 of the molding and the medial flange member 43 of said molding. The edge 34 preferably abuts the web portion 41 of the molding 40. The top surfaces of the panel and the leg 42 lie in the same horizontal plane without any upward projections above said plane. Furthermore, the top leg 42 abuts the panel 32 where it rises above the rabbeted edge 34.

It will also be observed that the peripheral flange 28 of the tray 21 is disposed in press fit between the medial leg 43 and the bottom leg 44 of the molding 40. The bent over edge 29 of the flange 28 of the tray is wedged in the pocket 45 in said molding 40. Moreover, it will be noted that the end of the bottom leg 44 preferably abuts in press fit the side wall of the peripheral channel 27 adjacent the channel flange member 28. Thus, the molding 40, the tray 21 and the peripheral edge of the panel 32 are permanently and positively locked together.

Figure 5:
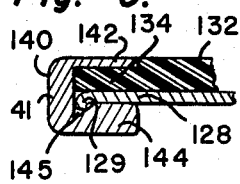
Fig. 5 is a fragmentary cross sectional view of another embodiment of the top construction of this invention.

The embodiment of Fig. 5 involves a top construction comprising a top panel 132, a base with a peripheral portion 128 and a peripheral molding 140.

The top panel 132 has a rabbet 134 at the periphery thereof.

Figure 2:
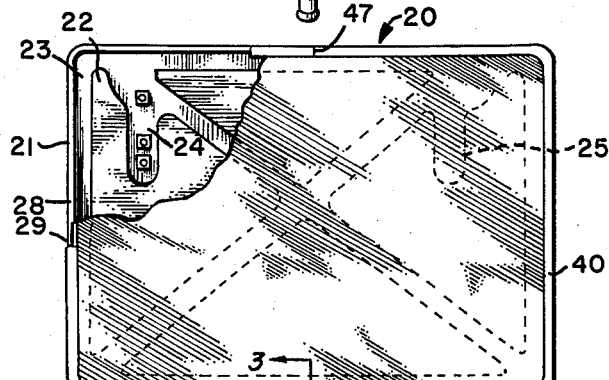
Fig. 2 is a plan view of the desk top of Fig. 1 with portions thereof broken away to reveal underlying structure.

The peripheral portion 128 of the base of Fig. 5 may be a flange member at the same height as the ridges shown in Figs. 2 and 3 and with a channel in between as in Figs. 2 and 3. The base peripheral portion 128 may also be a simple extension of the central portion of the base without any intervening channel such as shown in Figs. 2 and 3. In either case the peripheral portion 128 terminates in a bent peripheral edge 129 which is intended to curve away from the overlying rabbet 134.

The molding 140 of Fig. 5 has a web portion or rim 141, a top leg 142 and a bottom leg 144. Both of the legs 142 and 144 extend inwardly from said web portion 141. The bottom leg 144 comprises an undercut groove 145 longitudinally thereof adjacent the web portion 141.

The molding 140 functions to secure the periphery of the top panel 132 to the base. The top leg 142 contacts in press fit the rabbet 134 of the panel 132. Preferably the rabbet edge 134 abuts the web 141 and the top leg 142 abuts the panel whereat it rises above the rabbet 134. The top surface of the top leg 142, it will be observed, is flush with the top surface of the top panel 132. The top surface of the bottom leg 144 contacts in press fit the underside of the base peripheral portion 128 with the bent edge 129 wedged in said pocket or groove 145.

Materials of construction used in the desk top construction of this invention are conventional and need not be described in detail. The panels 32 and 132 may be a laminated plastic with the lamina, for example, comprising urea and phenol-formaldehyde resins absorbed in a fibrous base, such as the formica panels. While the concepts of this invention are especially useful in combination with laminated panels, they are not so limited. In other words, in the broader aspects of this invention the panels may be of the one piece type construction. The tray 21 may be pressed metal. The molding 41 and 140 may be extruded aluminum. The adhesive 36, for example, may be of a conventional, epoxy resin adhesive.

It is intended that the molding 40 and 140 be press fitted into place. Accordingly, the molding is extruded or formed with the top leg 42 and 142 and the bottom leg 44 and 144 tilted away from each other and from a line normal to the web 41 and 141. This is shown in Fig. 4 with reference to the molding 40. When the molding 40 and 140 is installed, however, the top and bottom legs are in press fit positions as shown in Figs. 3 and 5.

The panel 32 may be prepared for assembly by cutting out the same with the aid of a template from sheets of paneling stock and then forming the rabbeted edge 34 by passing the cut-out panel edgewise past a grinder or dado blade. As already mentioned, the depth of the rabbet is not necessarily related to the depth of the top laminae of the panel 32.

To assemble the desk top structure of Figs. 2 and 3, the ridges 22 of the tray 21 are coated with the adhesive 36 and the panel with the rabbeted edge is placed on top of the tray and centered. A strip of molding 40 of length corresponding to the peripheral length of the panel and tray and as formed (Fig. 4) is placed in position around the periphery of the panel and tray. The ends of the molding 40 should be adjacent one another as indicated by the line 47 of Fig. 2. The assembly is then positioned in a press, and the top and bottom legs 42 and 44 pressed toward each other, thereby locking the molding in place and seating the top panel and the base.

The desk top structure of Figs. 2 and 3 may also be assembled by applying the adhesive 36 either to the underside of an unrabbeted panel or to the ridges 22 of the tray 21, or to both panel and ridges, and then placing the panel on top of the tray. With the panel centered on the tray the rabbeted edge is then formed. The strip of molding 40 is then placed into position and the legs 42 and 44 pressed toward each other.

The same procedures may be used to assemble the desk top structure of Fig. 5.

The preferred structure of top construction of this invention is that of Figs. 2 and 3. The structure of Fig. 5 has a disadvantage in comparison to the structure of Figs. 2 and 3 in that it is not as sturdy under severe use conditions.

However, both structures have the advantage of more top surface area available for use, permanent and positive seating of the top panel to the underlying base, and ease and simplicity of manufacture.

This invention may be embodied in several forms without departing from the spirit or essential characteristics thereof. The embodiments described are therefore illustrative and not restrictive, since the scope of the invention is defined by the appended claims rather than by the description preceding them, and all changes that fall within the metes and bounds of the claims, or that form functional as well as conjointly cooperative equivalents, are therefore intended to be embraced by those claims.

We claim:

1. A top for a desk, said top comprising: a base having a flat peripheral portion and a flat support surface, the edge of said peripheral portion being bent away from the flat surface of said peripheral portion; a top panel seated on said support surface and comprising a peripheral rabbet; and a molding having at least an upper leg, a lower leg and an undercut pocket in said lower leg, said upper leg being seated in said peripheral rabbet with its top surface flush with the top surface of said top panel, said lower leg being press fit with the underside of said peripheral portion of said base, and said bent edge being wedged in said undercut pocket.

2. A top for a desk, said top comprising: a base having a peripheral flange; at least portions of said base forming a support surface in a common plane offset from said flange; the edge of said flange being bent away from said support surface; a top panel seated on said support surface; a molding having a central leg seated between and contacting both said flange and said top panel; said molding having an upper leg and a lower leg; said upper leg being clamped about the peripheral portion of said top panel; said lower leg being clamped about said flange; said molding having an undercut pocket therein for receiving said bent edge of said flange.

3. A top for a desk, said top comprising: a base having a peripheral flange; at least portions of said base forming a support surface in a common plane offset from said flange; the edge of said flange being bent away from said support surface; a top panel seated on said support surface; a molding having a central leg seated between and contacting both said flange and said top panel; said molding having an upper leg and a lower leg; said top panel having a peripheral rabbet in its upper surface of the same depth as the thickness of said upper leg; said upper leg being seated in said peripheral rabbet with its upper surface flush with the upper surface of said top panel; said lower leg being clamped about said flange; said molding having an undercut pocket therein for receiving said bent edge of said flange.

4. A top for a desk, said top comprising: a base having a peripheral flange; at least portions of said base forming a support surface in a common plane offset from said flange; the edge of said flange being bent away from said support surface; top panel seated on said support surface; a molding having a central leg seated between and contacting both said flange and said top panel; said molding having an upper leg and a lower leg; said upper leg being clamped about the peripheral portion of said top panel; said lower leg being clamped about said flange; said molding having an undercut pocket therein at the base of said lower leg for receiving said bent edge of said flange.

5. A top for a desk, said top comprising: a base having a peripheral flange; at least portions of said base forming a support surface in a common plane offset from said flange; the edge of said flange being bent away from said support surface; a top panel seated on said support surface; a molding having a central leg seated between and contacting both said flange and said top panel; said molding having an upper leg and a lower leg; said top panel having a peripheral rabbet in its upper surface of the same depth as the thickness of said upper leg; said upper leg being seated in said peripheral rabbet with its upper surface flush with the upper surface of said top panel; said lower leg being clamped about said flange; said molding having an undercut pocket therein at the base of said lower leg for receiving said bent edge of said flange.

6. A top construction for a desk and the like, which comprises: (1) a base having a raised, support portion with a flat, upper surface, and a peripheral rim portion comprising an outwardly, sidewise extending flange member terminating in a bent edge curved away from said flat, upper surface, the top surface of said flange member being spaced from the plane of the top surface of said flat portion by a distance $h$; (2) a panel adjacent said upper surface of said flat portion and comprising a peripheral rabbet, the top surface of which is a distance $t$ from the plane of the top surface of said panel, which rabbet has a width $w$; and (3) an edge molding around the peripheries of said base and panel, said molding comprising: a web portion abutting said flange member and said rabbet; a top flange portion of thickness $t$ extending inwardly over said rabbet a distance $w$ from said web portion, abutting said panel and in press fit with said rabbet; a medial flange portion of width $h$ inwardly extending under said rabbet in press fit therewith and inwardly extending over said flange member of said base in press fit therewith; and a bottom flange portion extending inwardly under said flange member of said base in press fit therewith, said lower flange portion comprising a longitudinal pocket in its upper surface adjacent said web and said bent edge being wedged in said pocket.

7. The top construction of claim 6 with a layer of adhesive bonding said panel to said raised support portion of said base.

8. A top construction for a desk and the like, which comprises: (1) a rectangular base in the form of a tray having a flat, support surface and a peripheral rim portion comprising a channel and an outwardly extending sidewise flange member terminating in a bent edge curving away from the plane of said flat, support surface, the top surface of said flange member being offset from said plane of the top surface of said flat portion by a distance $h$, the width of said flange member from said edge along the underside of said flange member to said channel being a distance $w'$; (2) a flat, rectangular panel adjacent said upper surface of said support portion and comprising a rabbeted edge having a thickness $t'$ and a width $w$, the top surface of said rabbeted edge being a distance $t$ from the plane of the top surface of said panel; and (3) a rim molding around the peripheries of said base and panel, said rim comprising: a web portion in abutment with said flange member and said rabbeted edge; a top flange portion of thickness $t$ extending inwardly over said rabbeted edge substantially a distance $w$ from said web portion, and in press fit with said edge; a medial flange portion of width $h$ extending inwardly under said rabbeted edge in press fit therewith and inwardly extending over said flange member of said base in press fit therewith; and a bottom flange portion having a width $w'$ from said web portion, extending inwardly under said flange member of said tray in press fit therewith and abutting said channel in press fit, said bottom flange portion comprising a longitudinal groove in its upper surface adjacent said web with said bent edge of said flange member being disposed therein in press fit therewith.

References Cited in the file of this patent

UNITED STATES PATENTS

| | | |
|---|---|---|
| 1,340,949 | Goodrich | May 25, 1920 |
| 1,690,286 | Fitch et al. | Nov. 6, 1928 |
| 2,237,840 | Nelson et al. | Apr. 8, 1941 |
| 2,568,153 | Hickman | Sept. 18, 1951 |
| 2,739,640 | Brinker et al. | Mar. 27, 1956 |
| 2,791,527 | Cawrysiak | May 7, 1957 |
| 2,851,323 | Braal et al. | Sept. 9, 1958 |